July 25, 1933.  O. H. TRUMAN  1,919,917
GEOPHYSICAL EXPLORATION METHOD
Filed Aug. 28, 1931
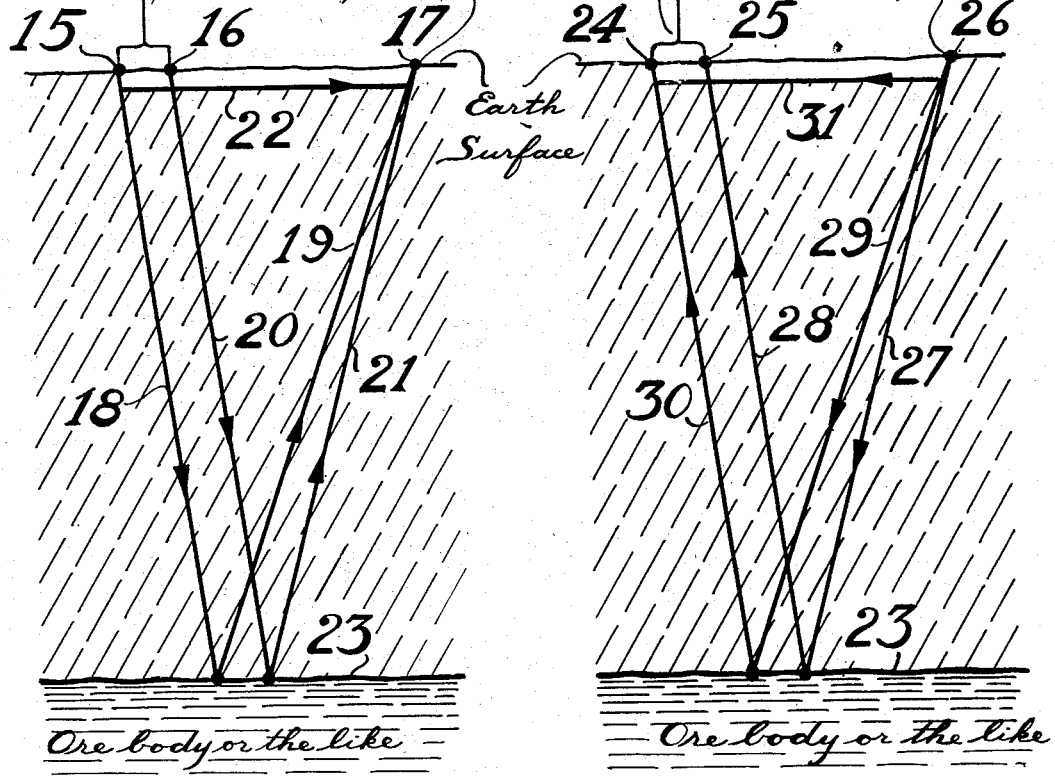

Patented July 25, 1933

1,919,917

UNITED STATES PATENT OFFICE

ORLEY H. TRUMAN, OF HOUSTON, TEXAS, ASSIGNOR TO STANDARD OIL DEVELOPMENT COMPANY, A CORPORATION OF DELAWARE

GEOPHYSICAL EXPLORATION METHOD

Original application filed January 22, 1929, Serial No. 334,340. Divided and this application filed August 28, 1931. Seral No. 559,938.

This invention relates to improvements in geophysical exploration methods involving the transmission of electrical or mechanical waves or periodic impulses through the earth. A principal object of the invention is to minimize or prevent the reception of confusing indications.

In electrical methods of the types referred to, difficulties are often encountered because secondary or induced electrical or magnetic fields are superposed upon the field produced by the primary exciting current. Accordingly, measurements of the latter field, as modified by the earth strata which it pervades, are rendered difficult or impossible of interpretation. Similarly when mechanical waves are employed the direct wave train passing from the transmitting to the receiving station may overlap with the reflected wave train from ore bodies or the like. In such cases accurate estimate of underground structure cannot be made. In accordance with my invention, these disadvantages and others of similar kind are counteracted by methods and means which will be fully understood from the following description read in connection with the accompanying drawing, in which:

Fig. 1 is a diagrammatic vertical section illustrating the application of my method to the use of mechanical or elastic waves; and Fig. 2 is a diagram similar to Fig. 1 and showing a modification.

Referring now to Fig. 1, numerals 15 and 16 indicate surface stations for setting off explosive charges or otherwise imparting trains of elastic or mechanical waves to the earth. These stations are separated by a distance equal to an odd number of half wave lengths of the waves being used, preferably one-half wave length. This distance is known by preliminary experiment in the area to be investigataed or by previous experience. A receiving station 17, with a seismograph or other indicating or recording instrument, is established at a point preferably several times as far from 16 as 16 is from 15. The three stations are in substantially the same straight line. The incident and reflected wave trains from stations 15 and 16 arriving at station 17 are indicated respectively by lines 18, 19, 20 and 21. Line 22 indicates the direct wave train passing through the overburden from the sending to the receiving station. The reflecting surface 23 is assumed to be an ore body or the like, the location of which is to be determined.

According to previous methods, a receiving instrument would be set up say at 17 and a train of waves sent out from 15, commonly by firing a charge of explosive at that point. This train of waves spreads out from point 15 and a portion strikes the ore body 23 or stratum sought for and is reflected back to point 17 where it is received on the instrument there located.

The disadvantage of this method is that there is also received at point 17 a direct train of waves which has come straight across from 15, nearly or quite along the surface. A portion of this train is likely to fall upon the reflected train making it impossible to say when the latter arrived. Also, if the points 15 and 17 are close enough together, the direct wave will be very much stronger than the reflected wave, because of the much less distance it has traveled. Then if the receiving apparatus has its sensitivity adjusted for the direct wave, the reflected wave will be too weak, and vice versa.

These disadvantages are overcome by my method which may be carried out in several ways. As illustrated in Fig. 1, two trains of waves are simultaneously started from 15 and 16. This may be done by firing two charges of explosives at these two points, at the same instant, by having their primers wired into the same electric circuit. It is not intended, however, to restrict this invention to cases where an explosive is used. It applies equally well to waves generated by any method, for example, by electrically driven oscillators. In the latter case the two oscillators are connected so as to agree in phase.

It will be understood that the direct waves from 15 and 16 will arrive at 17 with 180° difference of phase, and will cancel each other. On the other hand, so long as the distance from 15 to 17 is not too large compared to the depth of the stratum 23, the path 18 and 19 will be nearly the same as the path 20 and 21. The reflected waves along the two paths will therefore arrive at 17 in nearly the same phase and will therefore reinforce each other.

The distance between the sending and receiving stations will of course vary depending upon the nature of the locality. However, for example, the sending stations 15 and 16 may be spaced about 100 feet part and the receiving station may be about 1000 feet from the sending station nearest to it. This is for a wave length of 200 feet or about 60 meters, which is a common value.

In the embodiment of the invention illustrated in Fig. 2, receiving instruments are located at points 24 and 25, distant from each other by an odd number of half wave lengths, and a sending station at point 26. Lines 27, 28, 29 and 30 indicate the path of the incident and reflected wave trains from 26 to 24 and 25. Line 31 indicates the path of the direct wave train through the overburden from the sending to the receiving stations.

In operating this method a train of waves is sent out at 26 by an explosion, oscillator or other means and received at two receivers at 24 and 25. These receivers are connected, as by electrical means, to a common recording or other sensitive device. The direct wave will reach the receivers in opposite phase and, if they are properly connected, will cancel on the recording device, while the reflected waves will reach them in nearly the same phase as before and will reinforce each other. The distance between 25 and 26 is preferably several times as great as the distance between 24 and 25, although small compared to the depth of the stratum 23. This condition can generally be realized in practice. If the distance 25, 26 cannot conveniently be made large enough compared to the distance 24, 25, in other words, if the distance 24, 26 and the distance 25, 26 are not nearly equal, then the wave received at 25 will be considerably stronger than that received at 24, and one will only partially cancel the other. This effect of distance may be avoided by making the receiver at 24 somewhat more sensitive than the receiver at 25. In the plural sending station method above described, the source of waves at 15 may be somewhat more powerful so as to compensate for the greater distance of 15 from 17 than of 16 from 17.

It is evident that there will be a single half wave, at the beginning of the train, which will not be cancelled. Its duration, however, will be so short that it will be of no consequence. A persistent train of conflicting waves only is a serious obstacle.

It will be clear that instead of using only two sending points or only two receiving points, three or more could be used, with the sending or receiving power properly distributed among them, without departing from the spirit of this invention. In practice it will as a rule be simpler, cheaper and more convenient, and equally effective, to use only two elements as described above.

It is also apparent that the value of these methods of adjusting the space relation of impulses and indications caused thereby, is not confined to mechanical or elastic waves alone, though primarily intended for use in that connection. These methods of adjusting apply equally well to any kind of waves which may be used in underground exploration, such as electromagnetic or radio waves, or still more generally to any kind of periodic impulses representable as odd functions of the time. Similarly, I do not wish to be limited to any particular kind of impulse in the operation of my method first above described, in which the time relation of the impulses is adjusted.

This is a division of my co-pending patent application Serial No. 334,340 filed January 22, 1929.

Various changes and alternative arrangements may be made within the scope of the appended claims, in which it is my intention to claim all novelty inherent in the invention as broadly as the prior art permits.

I claim:

1. In a method of underground exploration by means of impulses passing in the form of direct and reflected waves between sending and receiving stations, the improvement which comprises sending wave impulses from at least two stations differing in distance from each other by substantially one half of the wave length in the upper layer of the earth's surface, whereby the direct waves from the stations are caused to arrive at the receiving station in opposite phase and cancel each other, and recording the waves reflected from sub-surface ore bodies or the like, such waves arriving in substantially the same phase.

2. Method according to claim 1 in which impulses are impressed upon the earth at points distant substantially an odd number of half wave lengths, whereby the direct waves are placed in such phase relation as to cancel each other, and receiving the waves from said points, and also reflected waves, at another point in the same straight line therewith.

ORLEY H. TRUMAN.